(12) United States Patent
Watanabe

(10) Patent No.: US 6,315,489 B1
(45) Date of Patent: Nov. 13, 2001

(54) FASTENING MEMBER

(75) Inventor: Morimichi Watanabe, Aichi (JP)

(73) Assignee: Nichiha Corporation, Aichi (JP)

( * ) Notice: Subject to any disclaimer, the term of this patent is extended or adjusted under 35 U.S.C. 154(b) by 0 days.

(21) Appl. No.: 09/449,489

(22) Filed: Nov. 29, 1999

(30) Foreign Application Priority Data

| Nov. 30, 1998 | (JP) | 10-338598 |
| Dec. 21, 1998 | (JP) | 10-362978 |
| Jan. 22, 1999 | (JP) | 11-014825 |

(51) Int. Cl.[7] ............................................. E04B 2/72
(52) U.S. Cl. .................. 403/381; 52/235; 52/506.05; 52/547; 248/300; 248/301; 248/304; 248/220.21
(58) Field of Search ................. 403/381, 403, 403/384, 386, 390, 399, 331, 231, 336, 380, 230, 247, 249, 251, 252, 256, 258, 260; 248/300, 301, 304, 307, 316.8, 225.11, 225.21, 220.21; 411/182, 508, 509, 913; 52/235, 506.05, 506.06, 547, 563, 564, 562, 565, 546, 597, 520, 506.01

(56) References Cited

U.S. PATENT DOCUMENTS

| 3,925,952 | * | 12/1975 | Hagel et al. | 52/235 |
| 4,361,998 | * | 12/1982 | Ellison et al. | 52/520 |
| 4,840,004 | * | 6/1989 | Ting | 52/235 |
| 5,155,958 | * | 10/1992 | Huff | 52/235 |
| 5,301,484 | * | 4/1994 | Jansson | 52/235 |
| 5,694,727 | * | 12/1997 | Dobija | 52/506.01 |
| 5,881,522 | * | 3/1999 | Dobija | 52/506.01 |
| 6,170,214 | * | 1/2001 | Treister | 52/235 |

FOREIGN PATENT DOCUMENTS

| 9-203184 | 8/1997 | (JP) . |
| 10-2089 | 1/1998 | (JP) . |

* cited by examiner

Primary Examiner—Lynne H. Browne
Assistant Examiner—Doug Hutton
(74) Attorney, Agent, or Firm—Lowe Hauptman Gilman & Berner, LLP

(57) ABSTRACT

A fastening member which comprises a substrate; a horizontal portion perpendicularly projected from the substrate; an upwardly inclined hook portion obliquely extended upward from a distal edge of the horizontal portion; a downwardly inclined hook portion obliquely extended downward from the distal edge of the horizontal portion; and a flat plate portion extended parallel with the substrate from a distal edge of the upwardly inclined hook portion and/or of the downwardly inclined hook portion. The substrate may be provided with an urging means for pressing the back surface of a siding board to prevent slipping.

11 Claims, 9 Drawing Sheets

FASTENING MEMBER

BACKGROUND OF THE INVENTION

The present invention relates to a fastening member to be employed for connecting boards such as siding boards to each other.

Recently, a large number of decorative siding boards having various surface patterns and designs are now put on the market in order to meet the consumer's demands for a more sophisticatedly designed external wall of housing.

In related arts, conventionally, the decorative siding boards are attached, via a underlayment using screws or nails, to the external wall of housing with the longitudinal direction of the siding boards being orientated in the horizontal or vertical direction. However, when the decorative siding boards are fastened using screws or nails, the decorative surface of the decorative siding boards may be damaged due to the screws or nails, thereby spoiling the decorative design of the siding boards.

In a prior art, with a view to overcome the aforementioned problems, a fastening member 30 as shown in FIG. 7 has been proposed as a fastening member for the horizontal installing of the siding boards (for example, Japanese Patent Unexamined Publication H9-203184). This fastening member 30 comprises a substrate 31, a horizontal portion 32 perpendicularly projected from the substrate 31, an upwardly inclined hook portion 33A obliquely extended upward from the distal edge of the horizontal portion 32, and a downwardly inclined hook portion 33B obliquely extended downward from the distal edge of the horizontal portion 32.

As shown in FIG. 8, a large number of the fastening members 30 (metallic fastening members) are adapted to be arrayed horizontally and fixed to a backing member 61 such as corner posts and studs by making use of screws 62 which are to be applied through vis holes 34 formed in the substrate 31. In this case, the siding boards 40A and 40B are respectively formed of a laterally elongated shape, four sides of which are respectively formed into a shiplap configuration. Specifically, the upper side and one lateral side of these siding boards 40A and 40B are respectively formed into an underlying rabbeted portion, while the lower side and the other lateral side these siding boards 40A and 40B are respectively formed into an overlying rabbeted portion. In the embodiment shown in FIG. 8, the lower side of the upper siding board 40A to be joined is formed into an overlying rabbeted portion, while the upper side of the lower siding board 40B is formed into an underlying rabbeted portion. The overlying rabbeted portion is consisted of a overlying tongue patterning portion 41 constituting the front side of the overlying rabbeted portion, an overlying tongue engaging portion 42 constituting the back side of the overlying rabbeted portion, and a groove portion 43 formed between the overlying tongue patterning portion 41 and the overlying tongue engaging portion 42. On the other hand, the underlying rabbeted portion is consisted of an underlying tongue engaging portion 44 constituting the back side of the underlying rabbeted portion and adapted to face the overlying tongue engaging portion 42.

The installation of the siding boards 40A and 40B can be performed as follows. First of all, the distal edge portion of the underlying tongue engaging portion 44 of a lower siding board 40B is fitted in the lower engaging portion 50B (which is formed with a substrate 31, a horizontal portion 32 and a downwardly inclined hook portion 33B) of the metallic fastening member 30 which has been attached in advance to the backing member 61, thereby securing the lower siding board 40B in a lateral state to the backing member 61.

Then, the overlying tongue engaging portion 42 of an upper siding board 40A is fitted in the upper engaging portion 50A (which is formed with a substrate 31, a horizontal portion 32 and an upwardly inclined hook portion 33A) of the metallic fastening member 30, thereby securing the upper siding board 40A to the underlayment 61. Since the upper siding board 40A and the lower siding board 40B are connected in this manner, there is little possibility that the surfaces of these siding boards are damaged as in the case of fastening with screws or vises, and at the same time, the existence of the metallic fastening member 30 cannot be externally recognized, thus making it possible to provide a very preferable external appearance of board siding.

By the way, FIG. 9 shows a siding board 40 as viewed from the front surface side thereof (the side to which a design is applied), the siding board 40 being provided with underlying rabbeted portions 44A,44B at the top side and right side thereof and with overlying rabbeted portions 41A, 41B at the bottom side and left side thereof. More specifically, an underlying rabbeted portion 44A is formed horizontally at the top side of the siding board 40, while an underlying rabbeted portion 44B is formed perpendicularly at the right side of the siding board 40. A caulking agent 45A or 45B is coated on a front surface portion of each of the underlying rabbeted portions 44A and 44B, which is spaced apart by a predetermined distance from the inner corner portion of each of the underlying tongue engaging portions 44A and 44B. This caulking agent may be applied also to a back surface portion of each of the horizontally extending overlying tongue patterning portion 41A and the vertically extending overlying tongue patterning portion 41B (which constitute the bottom side and left side of the siding board 40, respectively), which is spaced apart by a predetermined distance from the inner corner portion of each of the overlying tongue patterning portions 41A and 41B.

FIG. 10 is a perspective view illustrating partially a connected state of siding boards which are piled in the vertical direction. In this case, the overlying rabbeted portion formed at the bottom side of the upper siding board 40A is fittingly connected with the underlying rabbeted portion formed at the top side of the lower siding board 40B. At this occasion, a gap S is formed at the connected portion between these siding boards 40A and 40B. Further, a number of the siding boards are designed to be laterally placed on both sides (right and left sides) of the these siding boards 40A and 40B. In this case, the overlying rabbeted portion formed at the left side of the siding board is fittingly connected with the underlying rabbeted portion formed at the right side of the upper siding board 40A (and of the lower siding board 40B). On this occasion, a gap S2 is also formed at the connected portion between these siding boards. As seen from FIG. 10, the gap S1 extending horizontally becomes contiguous with the gap S2 extending vertically.

There is a possibility that rain water may leak into these gaps S1 and S2. Since the caulking agent 45A applied to the front surface portion of the underlying rabbeted portion 44A of the top side of the lower siding board 40B is caused to contact with the back surface of the overlying tongue patterning portion 41A of the bottom side of the upper siding board 40A so as to form a sealing portion, it is possible to prevent the rain water that has been entered into the horizontal gap S1 from slipping vertically into the back surface side of the siding board 40A and 40B. Likewise, it is also possible to prevent the rain water that has been entered into the vertical gap S2 from slipping laterally into the back surface side of the siding board 40A and 40B.

On the other hand, the rain water that has been entered into the horizontal gap S1 is caused to move horizontally to reach the vertical gap S2 and to flow downward through this vertical gap S2. By the way, as shown in FIG. 8, although the metallic fastening member 30 is disposed at the junction between the siding boards 40A and 40B, since the inner surface of the upwardly inclined hook portion 33A of the metallic fastening member 30 is closely contacted with the inclined surface of the overlying tongue engaging portion 42 of the upper siding board 40A, there is little possibility that the rain water flowing downward through the vertically extending gap S2 may slip or leak into the interior of the upper engaging portion 50A (a trace amount even if there is any leakage), so that the rain water is possibly caused to flow downward after passing over the top side of the upwardly inclined hook portion 33A, thereby allowing the rain water to enter into the space Sa having a triangular cross-section, which is encircled by the front surface of the upwardly inclined hook portion 33A, the front surface of the downwardly inclined hook portion 33B and the back surface of the overlying tongue patterning portion 41 of the upper siding board 40A.

As mentioned above, since a seal portion is formed between the back surface of the overlying tongue patterning portion 41 A of the bottom side of the upper siding board 40A and the front surface of the underlying tongue-attached portion 44A of the upper side of the lower siding board 40B, the rain water that has been entered into the space Sa having a triangular cross-section as mentioned above is caused to temporarily retain inside the space Sa without immediately flowing downward from the space Sa. The rain water retaining inside the space Sa is caused to move right and left, and then leaks out from the side edges of the hook portions 33A and 33B, thereby causing the rain water to flow into a space which is formed higher than the caulking agent 45A that has been applied horizontally to the front surface of the underlying tongue-attached portion 44A of the upper side of the lower siding board 40B. Likewise, the rain water that has been leaked into the upper engaging portion 50A is also caused to leak out from the side edges of the hook portions 33A and 33B or of the horizontal portion 32, thereby causing the rain water to flow into the aforementioned space. Since this space is communicated with the back side of the siding boards 40A and 40B, the rain water leaked into the space is allowed to enter into the back side of the siding boards 40A and 40B, thus damaging the siding boards.

BRIEF SUMMARY OF THE INVENTION

Therefore, an object of the present invention is to provide an improved fastening member which is capable of positively preventing rain water from leaking into the back side of the siding board, which the conventional fastening member has failed to prevent so far.

With a view to realize the aforementioned objects, the present invention provides a fastening member which comprises;
a substrate; a horizontal portion perpendicularly projected from the substrate; an upwardly inclined hook portion obliquely extended upward from a distal edge of the horizontal portion; a downwardly inclined hook portion obliquely extended downward from the distal edge of the horizontal portion; and a flat plate portion extended parallel with the substrate from a distal edge of the upwardly inclined hook portion and/or of the downwardly inclined hook portion.

In the case of the fastening member according to the present invention, the rain water flowing downward through the vertical gap S2 and then passing over the distal edge of the upwardly inclined hook portion is allowed to flow downward along the front surface of the flat plate portion formed contiguous with the distal edge of the upwardly inclined hook portion. Since this flat plate portion is designed to be kept contacted with the back surface of the overlying tongue patterning portion of the upper siding board, the rain water flowing downward is caused to be discharged positively toward the front side of the siding board through the gap formed at the vertically connected portion between the right and left siding boards without causing the rain water to spread laterally. Therefore, the rain water that has been entered through the horizontal and vertical gaps can be prevented from leaking into the back side of the siding board.

The flat plate portion must be a flat surface which is parallel with the substrate, and such a flat surface can be made by cutting and bending the substrate, or by extrusive molding. In the case of the latter, the contact of the flat plate portion with the back surface of the overlying tongue patterning portion of the upper siding board can be further ensured, thus more completely preventing rain water from leaking into the back surface of the siding board.

According to a preferable embodiment of this fastening member, the substrate is featured in that it is provided with an urging means for pressing the back surface of a siding board to prevent slipping. As a result, the engagement between the siding board and the fastening member can be more stabilized. Further, according to another preferable embodiment of this fastening member, the substrate is featured in that it is provided with an upstanding portion at the upper edge and at the lower edge thereof, the upstanding portion being projected backward from the back surface of the substrate. As a result, an air flow passageway can be easily formed between the siding board fastened and a underlayment attached to the building frame, thus making it possible to easily prevent the generation of dropwise condensation.

DETAILED DESCRIPTION OF THE INVENTION

Preferable embodiments of the fastening member according to the present invention will be explained in details below with reference to the drawings.

Figure 1:
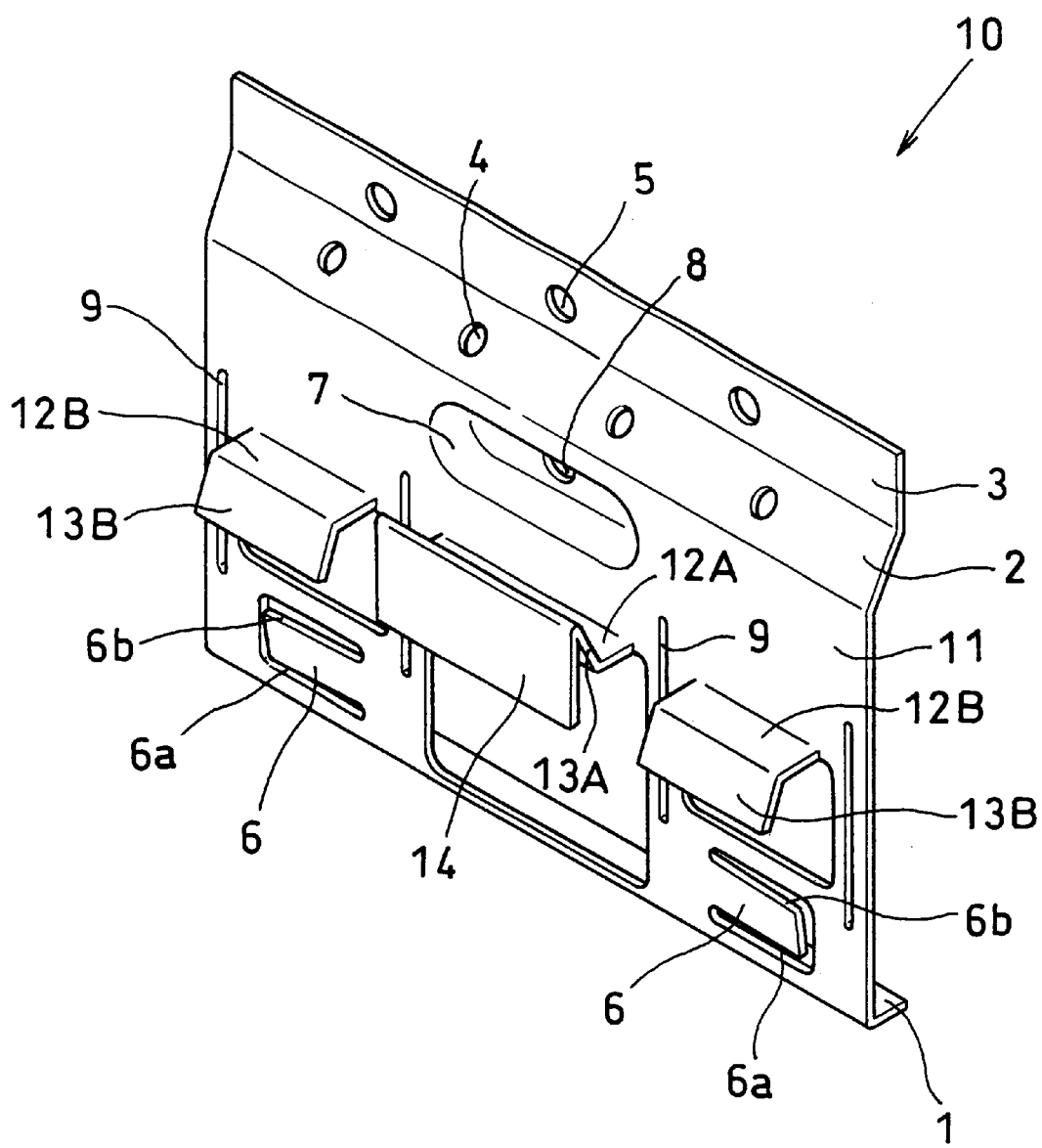
FIG. 1 is a perspective view illustrating a fastening member representing one embodiment of the present invention.

FIG. 1 shows a perspective view illustrating one embodiment of the fastening member according to the present invention. This fastening member is made of a metallic material such as iron and stainless steel. The lower fringe portion of the square substrate 11 is bent backward thereby forming an upstanding portion 1, and the upper fringe portion of the square substrate 11 is obliquely bent backward thereby forming an upstanding portion 2 as well as a vertical portion 3 which is formed contiguous to the distal edge of the upstanding portion 2. The upstanding portion 2 and the vertical portion 3 are provided with a plurality of throughholes 4 and 5, respectively, for nailing the fastening member a stud through a underlayment 61.

Figure 7:
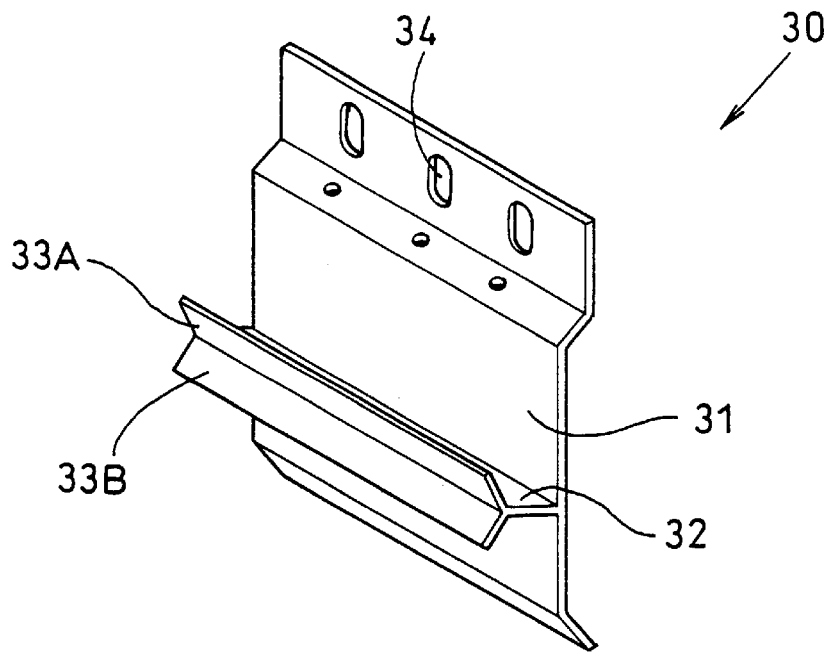
FIG. 7 is a perspective view illustrating a fastening member of the prior art.

The central portion of the substrate 11 is cut in a U-shape and raised therefrom. Specifically, this cut portion is initially bent forward by an angle of 90 degrees thereby forming a horizontal portion 12A, and then, the portion extending forward from this horizontal portion 12A is further bent obliquely upward thereby forming an upwardly inclined hook portion 13A, and finally, the portion extending forward from this upwardly inclined hook portion 13A is further bent downward thereby forming a flat plate portion 14. The horizontal portion 12A and the upwardly inclined hook portion 13A are designed to function in the same manner as the horizontal portion 32 and the upwardly inclined hook portion 33A of the conventional fastening member 30 shown in FIG. 7.

The right and left portions of the substrate 11 are also cut in a U-shape and raised, respectively. These cut portions are initially bent forward by an angle of 90 degrees at approximately the same level as that of the location of the horizontal portion 12A thereby forming a horizontal portion 12B, and then, the portion extending forward from this horizontal portion 12B is further bent obliquely downward thereby forming a downwardly inclined hook portion 13B. The horizontal portion 12B and the downwardly inclined hook portion 13B are designed to function in the same manner as the horizontal portion 32 and the downwardly inclined hook portion 33B of the conventional fastening member 30 shown in FIG. 7.

The two cut and raised portions located below the aforementioned right and left U-shaped cut and raised portions 12B, 12B of the substrate 11 are also cut in a U-shape and raised, forming cantilever-like raised cut portions 6, 6, the free ends of which being extended laterally so as to render them to act as an urging means. Furthermore, these raised cut portions 6, 6 are respectively twisted such that the upper edges 6b, 6b thereof are protruded forward as compared with the positions of the lower edges 6a, 6a thereof. Additionally, a recessed portion 7 which is recessed backward is formed over the aforementioned central raised cut portion, and is provided in the bottom thereof with a through-hole 8. The depth of the recessed portion 7 is made approximately identical with the height of the upstanding portion 1 of the substrate 11. The reference numeral 9 represents a U-shaped groove which is provided for ensuring the strength of the substrate 11.

Figure 2:
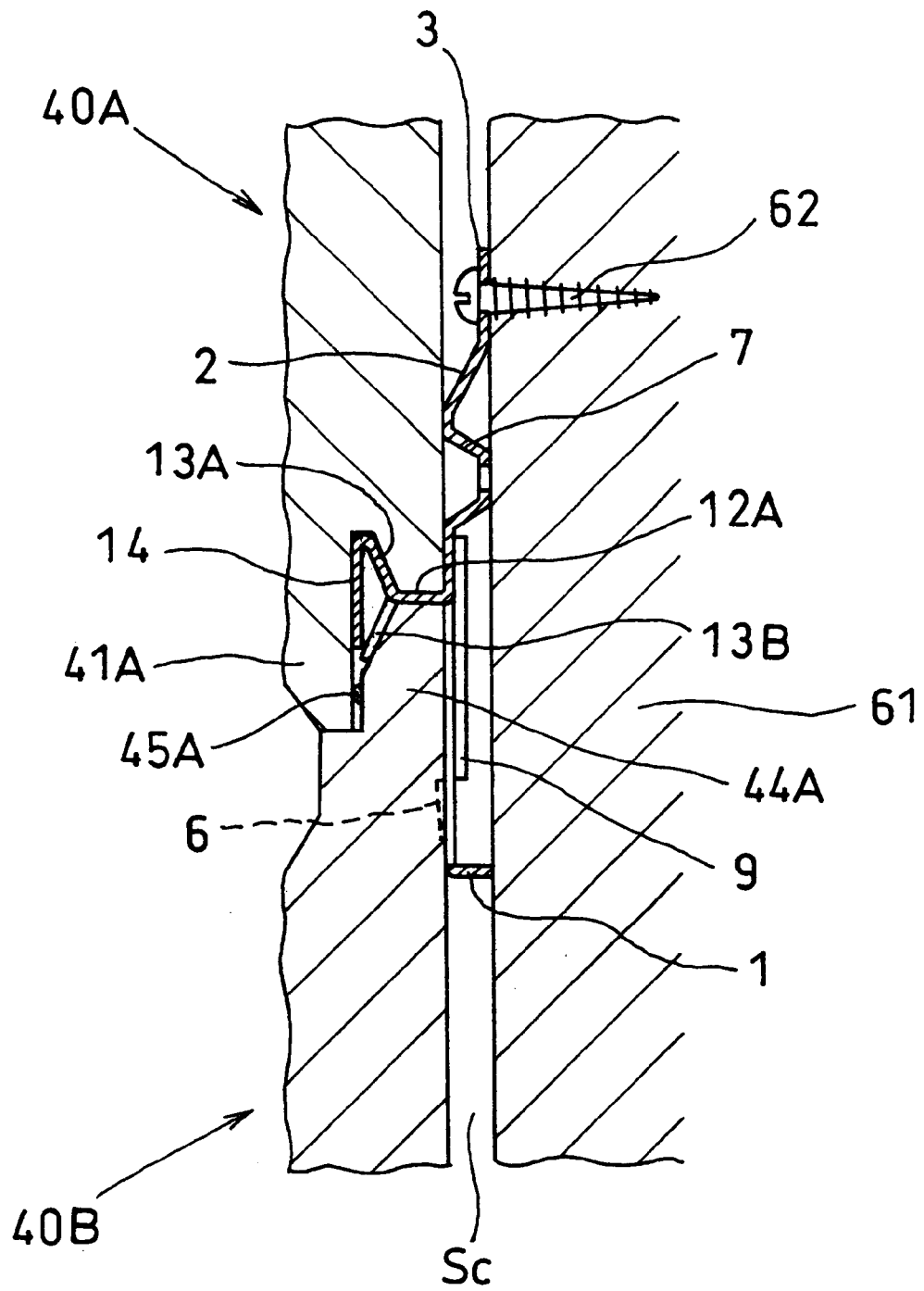
FIG. 2 is a longitudinal sectional view illustrating the manner of using the fastening member shown in FIG. 1.
Figure 3:
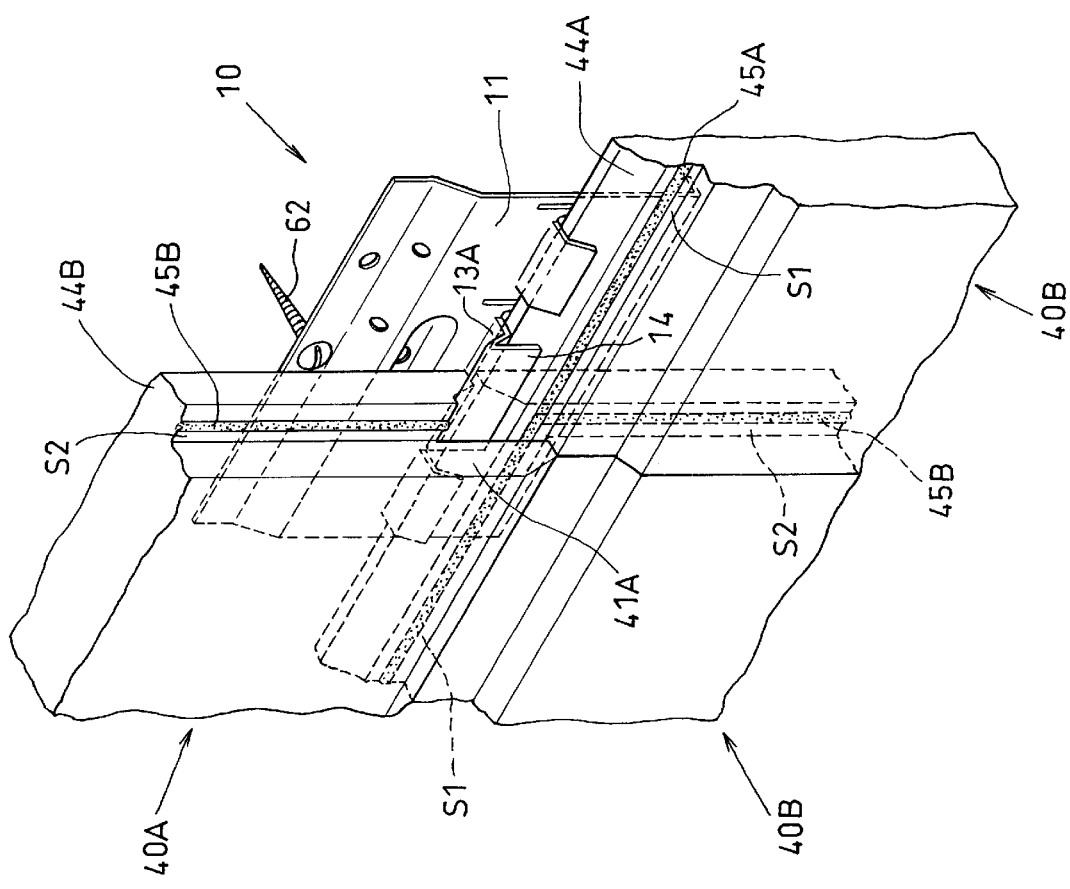
FIG. 3 is a perspective view illustrating the manner of using the fastening member shown in FIG. 1.
Figure 8:
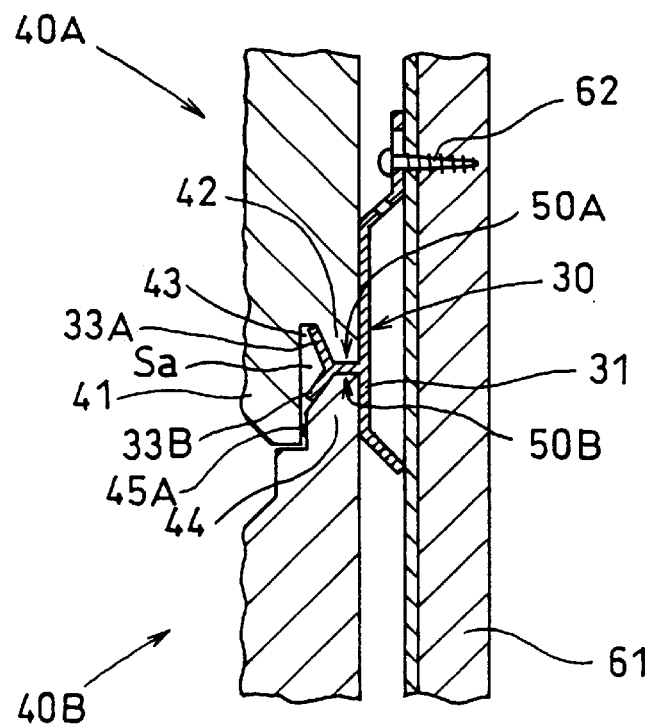
FIG. 8 is a longitudinal sectional view illustrating the manner of using the fastening member shown in FIG. 7.
Figure 9:
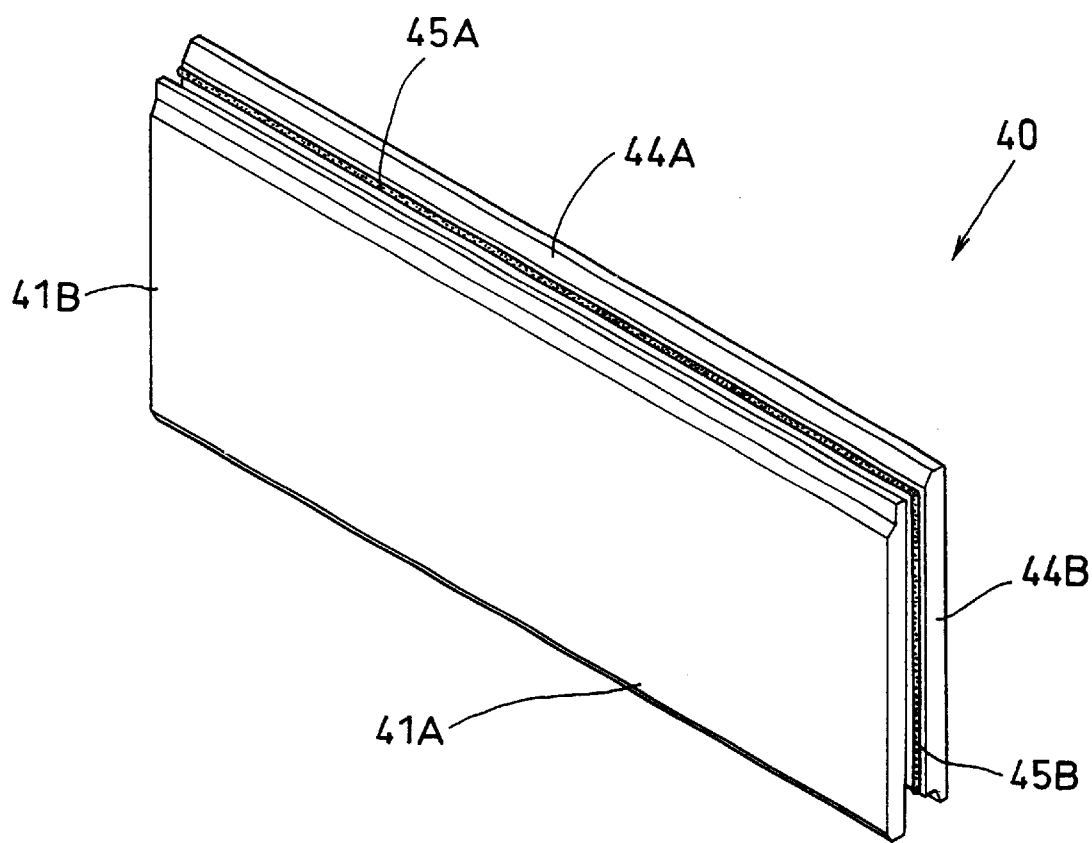
FIG. 9 is a perspective view illustrating one example of siding board.
Figure 10:
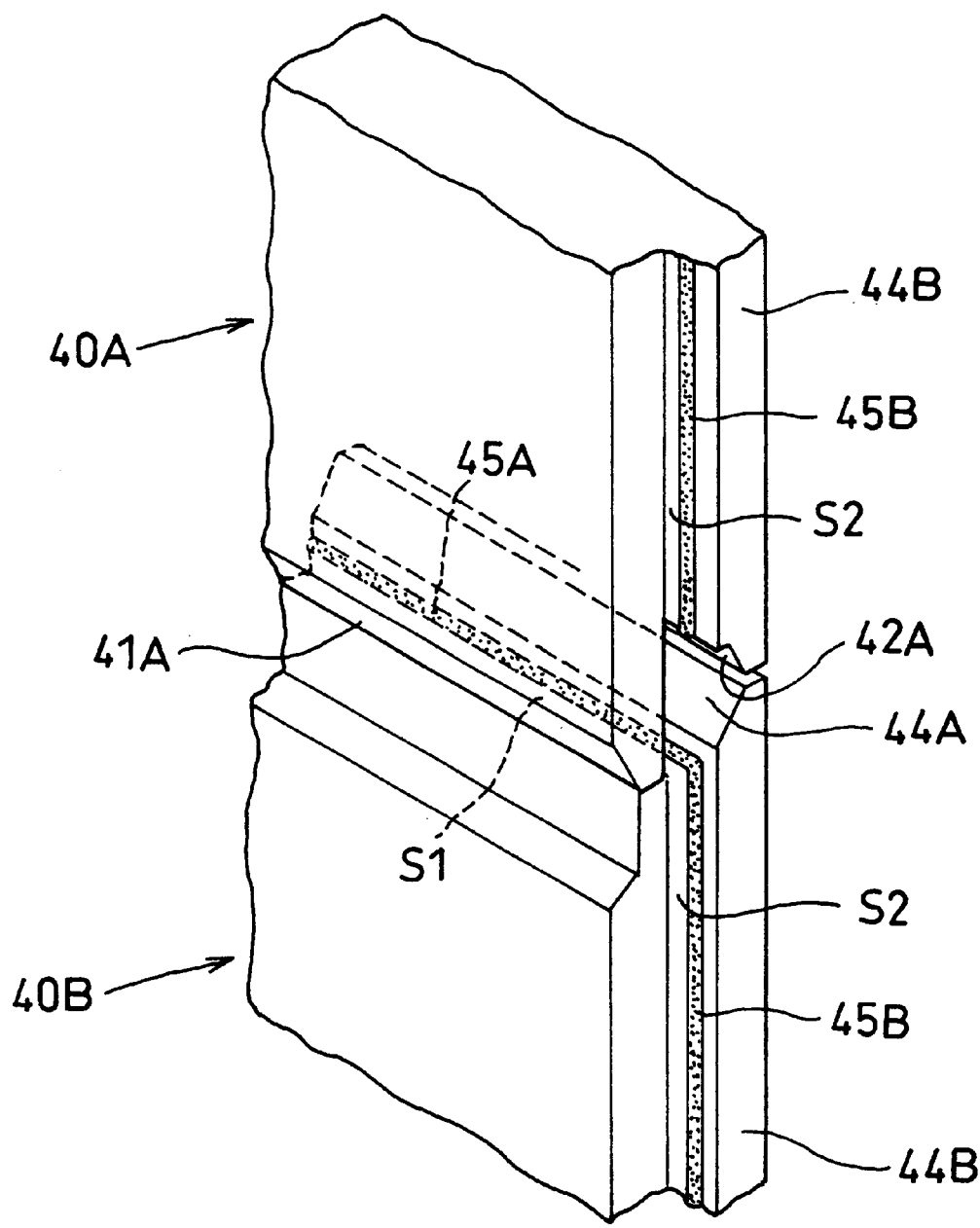
FIG. 10 is a perspective view illustrating a state wherein the siding boards shown in FIG. 9 are assembled with each other.

FIGS. 2 and 3 illustrate a fastened state of the siding boards 40A and 40B, such as the siding board 40 shown in FIG. 9, which are installed by making use of the fastening member 10. Specifically, these siding boards 40A and 40B are fastened in the same manner as illustrated with reference to FIG. 8. The relationship between these siding boards 40A and 40B in the fastened state thereof is the same as illustrated with reference to FIGS. 8 and 10. Therefore, the same members as indicated in FIGS. 8 and 10 are identified by the same reference numerals thereby to omit the detailed explanation thereof.

As shown in FIG. 2, in the case of this fastening member 10, the portion extending forward from the upwardly inclined hook portion 13A is bent downward thereby forming a flat plate portion 14, so that when the siding board 40A is fastened, this flat plate portion 14 is kept contacted with the back surface of the overlying tongue patterning portion 41 A of the upper siding board 40A. Therefore, there is no possibility of creating the space Sa of triangular cross-section as shown in FIG. 8 between the fastening member 10 and the siding board 40A, so that the rain water flowing downward through the vertical gap S2 formed at the joint portion between the right and left siding boards is caused to flow down through the flat plate portion 14 and discharged toward the front side of the siding board 40A. Therefore, the retention of rain water in the vicinity of the hook portion that has been frequently experienced in the case of the conventional fastening member can be prevented to occur, thus making it possible to reliably prevent the rain water from leaking into the back side of the siding board 40A.

Further, since the siding board 40A is kept pressed toward the back surface of the downwardly inclined hook portion 13B by the presence of the raised cut portions 6 extending laterally and functioning as an urging means, the engagement between the siding board 40A and the fastening member 10 can be stabilized. Additionally, since these raised cut portions 6 are respectively twisted such that the upper edge 6b thereof is protruded forward as compared with the position of the lower edge 6a thereof, the insertion of the siding board 40A into the fastening member 10 can be facilitated. Moreover, since the substrate 11 is provided with upstanding portions 1 and 2 at the upper edge and at the lower edge thereof, the upstanding portions being projected backward from the back surface of the substrate 11, an air flow passageway Sc (see FIG. 2) is caused to be formed between the siding boards 40A and 40B fastened and the building frame 61, thus making it possible to prevent the generation of dropwise condensation on the back surface of the siding boards 40A and 40B.

Figure 4:
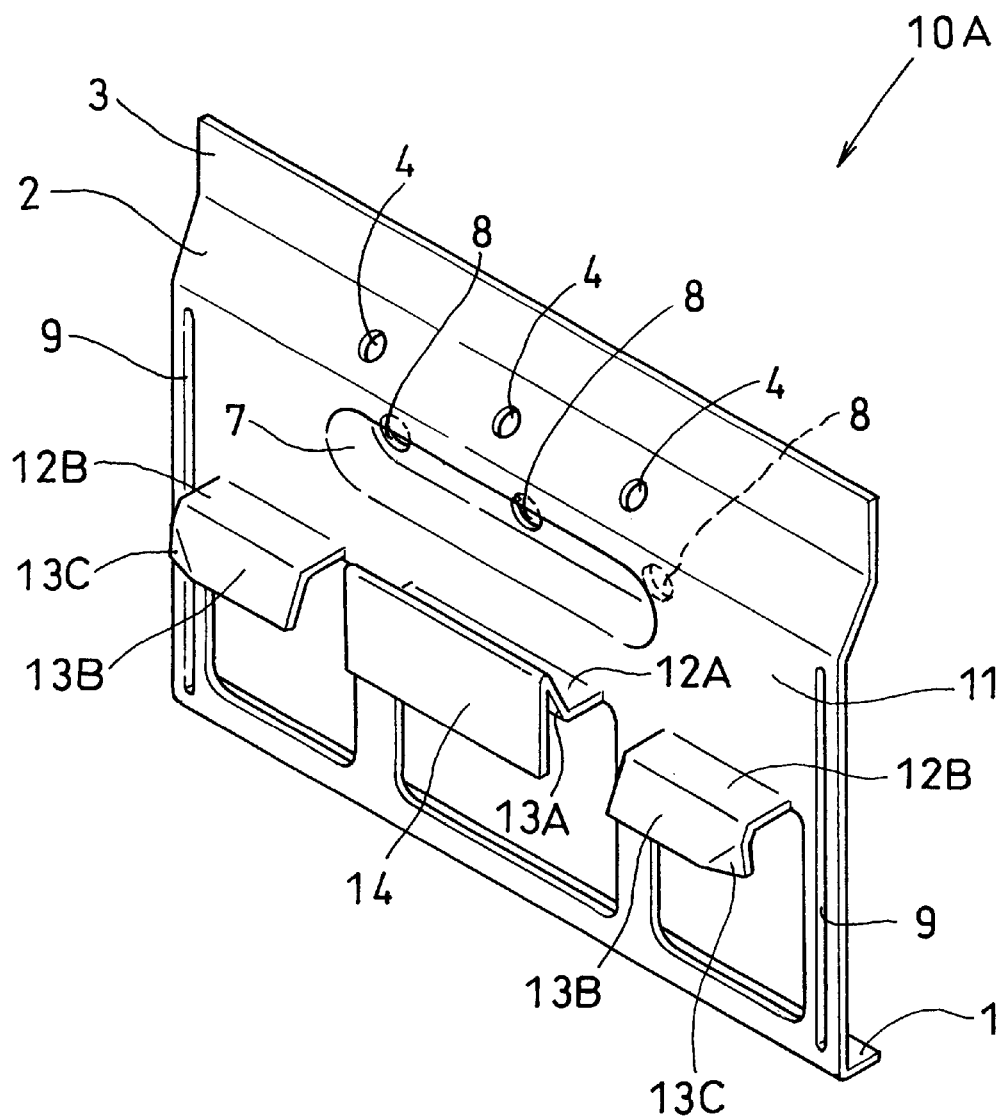
FIG. 4 is a perspective view illustrating a fastening member representing another embodiment of the present invention.

FIG. 4 is a perspective view illustrating a fastening member representing another embodiment of the present invention. This fastening member 10A mainly differs from the fastening member 10 shown in FIG. 1 in that the portions below the right and left raised cut portions are widely cut out. In FIG. 4, the members having the same function as those shown in FIG. 1 are identified by the same reference numerals. Since the portions below the right and left raised cut portions are widely cut out in this fastening member 10A, the raised cut portions 6 extending laterally and functioning as an urging means as seen in the fastening member shown in FIG. 1 cannot be formed. However, since a lower outer side portion of each of the downwardly inclined hook portions 13B which are formed together with the horizontal portions 12B from the right and left raised cut pieces of the substrate 11 is bent inward to thereby form a bent portion 13C, the strength of the downwardly inclined hook portions 13B can be enhanced, thus ensuring the stability of the engagement between the siding board 40 and the fastening member 10.

Further, the recessed portion 7 which is formed over the central raised cut portion and recessed backward is made longer than the recessed portion 7 of the substrate 11 shown in FIG. 1, thereby enhancing the resistivity to the twisting of the entire body of the fastening member 10A as well as to the external pressure. In this case, since the fastening member 10A can be attached to a underlayment by nailing it at a portion which is close to the center thereof, the fastening strength of the fastening member 10A to a stud through a underlayment 61 can be greatly improved as compared with the conventional method of nailing the fastening member mainly through the vertical portion 3 thereof. As a result, the retaining strength of the siding boards can be greatly improved. Further, since the recessed portion 7 is laterally elongated, it becomes possible to provide the recessed portion 7 with a plural number of through-holes 8 (three in this embodiment shown in FIG. 4), thus enhancing the degree of freedom at the occasion of attaching the fastening member 10A to a underlayment 61. Accordingly, it is no more required to form the nailing holes 5 at the distal vertical portion 3.

The manner of using this fastening member 10A is substantially the same as that illustrated with reference to FIG. 1. Namely, due to the presence of the flat plate portion 14, the rain water flowing downward through the vertical gap S2 formed at the connection between the right and left siding boards is caused to flow toward the front side of the siding board 40, thus making it possible to reliably prevent the rain water from leaking into the back side of the siding board 40.

Figure 5:
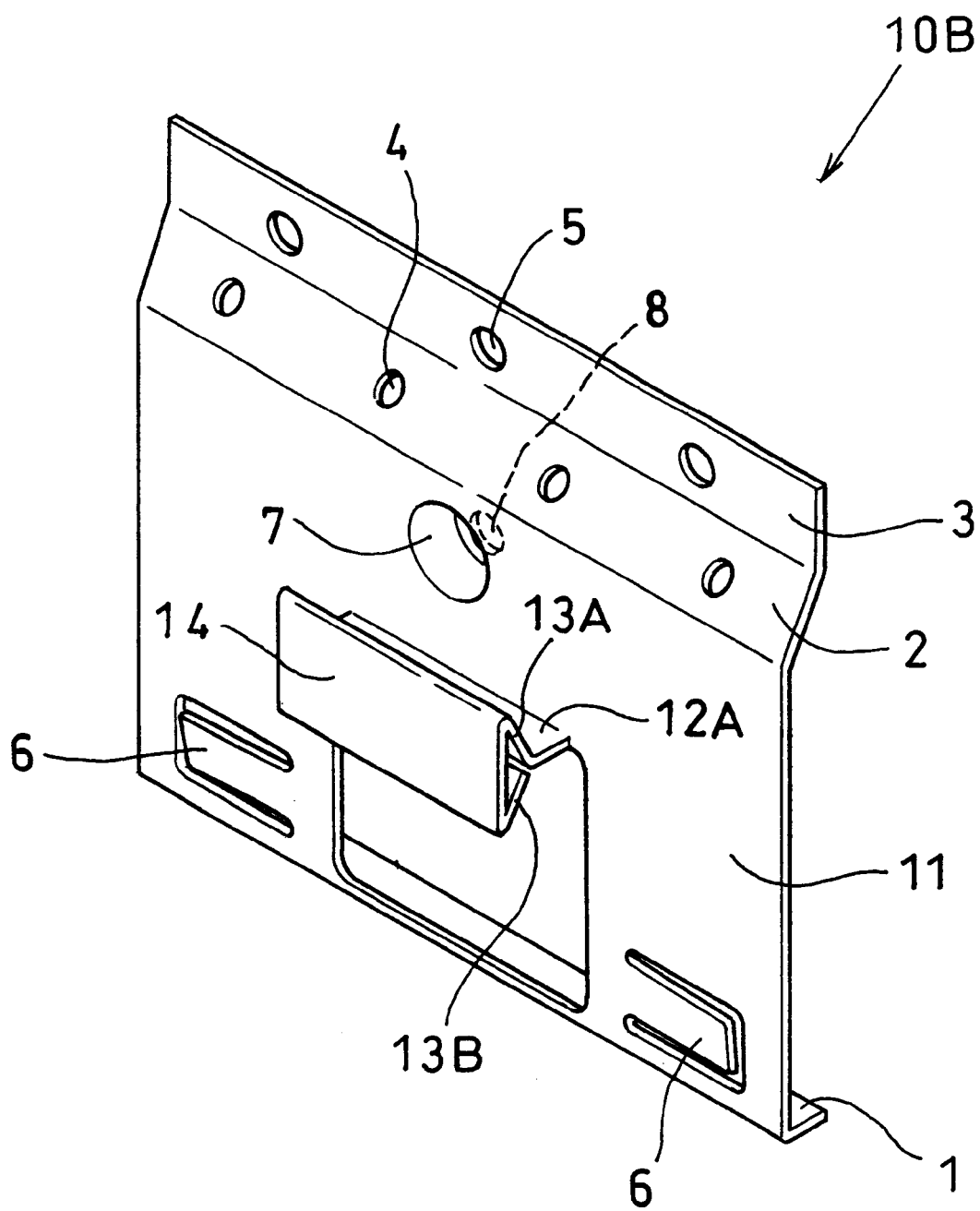
FIG. 5 is a perspective view illustrating a fastening member representing a further embodiment of the present invention.

FIG. 5 is a perspective view illustrating a fastening member representing still another embodiment of the present invention. In the case of this fastening member 10B, the central portion of the substrate 11 is cut in a U-shape and raised therefrom, thereby forming a single U-shaped cut and raised portion. Specifically, this cut and raised portion is initially bent forward by an angle of 90 degrees thereby forming a horizontal portion 12A, then, the portion extending forward from this horizontal portion 12A is further bent obliquely upward thereby forming an upwardly inclined hook portion 13A, further, the portion extending forward from this upwardly inclined hook portion 13A is further bent downward thereby forming a flat plate portion 14, and finally, the lower portion of the flat plate portion 14 is bent backward and at the same time, obliquely upward thereby forming a downwardly inclined hook portion 13B. The structures other than those mentioned above are almost the same as those of the fastening member 10 shown in FIG. 1. In this case, the aforementioned downwardly inclined hook portion 13B is designed to function in the same manner as the downwardly inclined hook portion 33B of the conventional fastening member 30 shown in FIG. 7.

The manner of using this fastening member 10B is substantially the same as that illustrated with reference to FIG. 1. Namely, the rain water flowing downward through the vertical gap S2 formed at the connection between the right and left siding boards is reliably prevented from leaking into the back side of the siding board 40.

Figure 6:
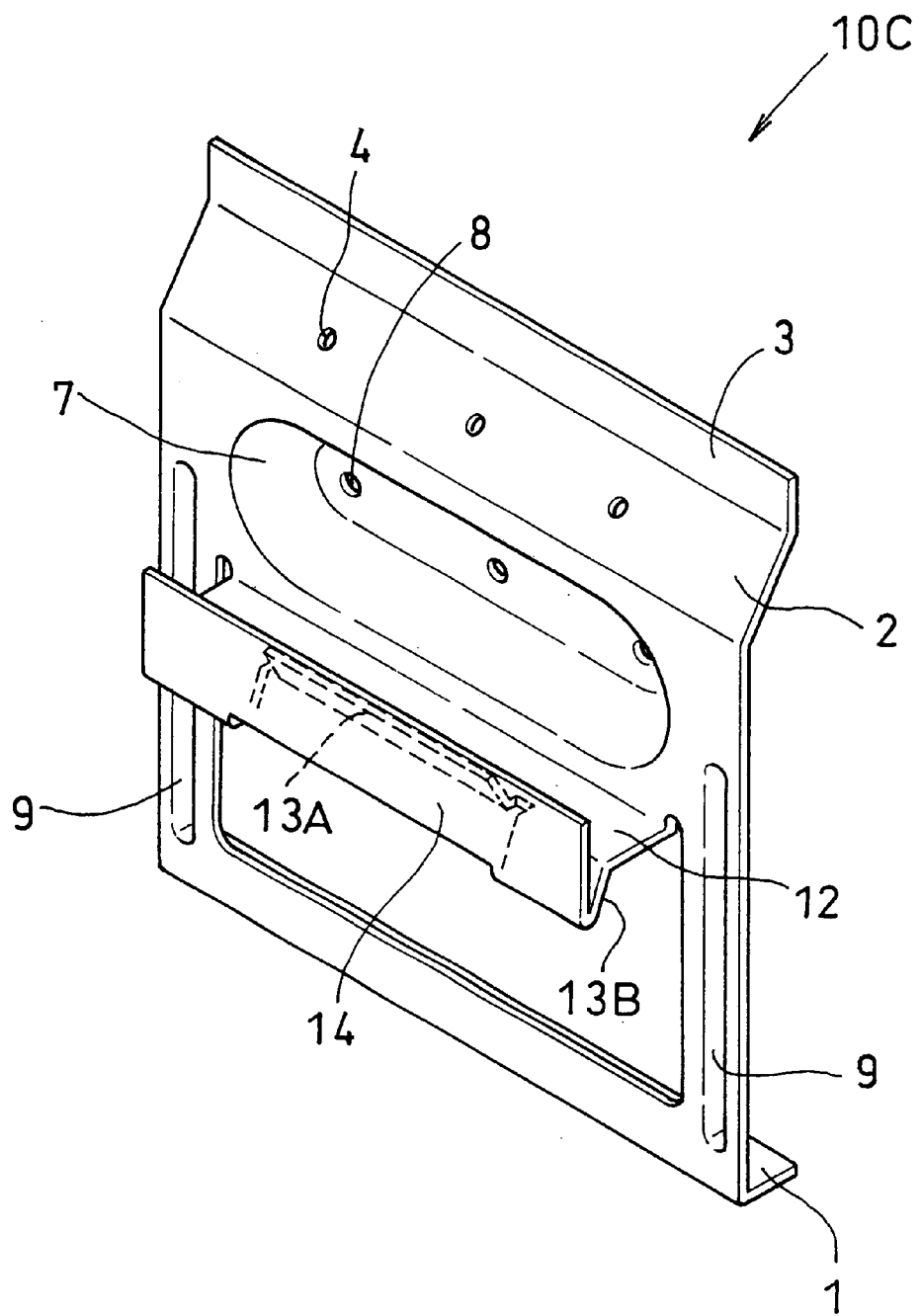
FIG. 6 is a perspective view illustrating a fastening member representing still another embodiment of the present invention.

FIG. 6 is a perspective view illustrating a fastening member representing still another embodiment of the present invention. In the case of this fastening member 10C, a single U-shaped cut and raised portion is formed to extend throughout almost the entire width of the lower half portion of the substrate 11. Specifically, this cut portion is initially bent forward by an angle of 90 degrees thereby forming a horizontal portion 12, then, the portion extending forward from this horizontal portion is further bent obliquely downward thereby forming a downwardly inclined hook portion 13B, and further, the portion extending forward from this downwardly inclined hook portion 13B is further bent upward thereby forming a flat plate portion 14. These horizontal portion 12 and the downwardly inclined hook portion 13B are designed to function in the same manner as the horizontal portion 32 and the downwardly inclined hook portion 33B of the conventional fastening member 30 shown in FIG. 7.

The central portion of the downwardly inclined hook portion 13B is cut in a U-shape thereby forming a cut portion having a proximal end in the vicinity of the bent portion between the horizontal portion 12 and the downwardly inclined hook portion 13B, the free end portion of this cut portion that extends from the proximal end thereof is obliquely bent upward, thereby forming an upwardly inclined hook portion 13A. This upwardly inclined hook portion 13A functions in the same manner as the upwardly inclined hook portion 33A of the conventional fastening member 30 shown in FIG. 7.

A recessed portion 7 which is laterally elongated in the same manner as that of the fastening member 10A shown in FIG. 4 is integrally formed over the aforementioned raised cut portion of the substrate 11, and is provided in the bottom thereof with a plurality of nailing through-hole 8 (three in the embodiment shown in FIG. 6).

The manner of using this fastening member 10C is also substantially the same as that illustrated with reference to FIG. 1. Namely, the rain water flowing downward through the vertical gap S2 formed at the connection between the right and left siding boards is reliably prevented from leaking into the back side of the siding board 40.

Particularly, in the case of this fastening member 10C, since the flat plate portion 14 is formed by bending upward the distal portion of the downwardly inclined hook portion 13B and at the same time, the upwardly inclined hook portion 13A is formed by cutting a portion of the downwardly inclined hook portion 13B and then by obliquely bending the cut portion upward, the formation of such a curved portion (a radius portion) at the upper edge of the flat plate portion 14 as seen in the case of the fastening member 10 shown in FIGS. 1, 4 and 5 can be avoided as shown in FIG. 6. As a result, the entire surface of the flat plate portion 14 can be closely contacted, without fail, with the back surface of the overlying tongue patterning portion 41A of the upper siding board 40A. Additionally, the breadth of the substrate 11 can be made smaller without inviting the deterioration in strength. Therefore, it is possible to cause the rain water flowing downward through the vertical gap S2 to reliably pass over the upper edge of the flat plate portion 14 and to flow downward. Accordingly, the rain water can be reliably prevented from leaking into the back side of the siding board 40, and at the same time, the fastening member can be miniaturized as a whole.

By the way, according to the fastening member of the present invention, the number of nailing hole (for example, through-holes 4 and 5 to be formed in the inclined upstanding portion 2 and in the vertical portion 3 extended from the upstanding portion 2) for attaching the fastening member to a underlayment, or the location of the nailing holes may be optionally determined, so that they may be suitably determined depending on the fastening strength demanded for the fastening member. Further, the selection of the through-holes for nailing the fastening member is also optional.

What is claimed is:

1. A fastening member, comprising:
   a substrate;
   a horizontal portion substantially perpendicularly projected from the substrate;

an upwardly inclined hook portion obliquely extending upward from a first section of a distal edge of the horizontal portion;

a downwardly inclined hook portion obliquely extending downward from a second section of the distal edge of the horizontal portion; and a flat plate portion extending in parallel with the substrate from a distal edge of one of the upwardly inclined hook portion and the downwardly inclined hook portion toward the other hook portion.

2. The fastening member according to claim 1, wherein the upwardly inclined hook portion and the downwardly inclined hook portion are formed contiguous to the first and second sections of the distal edge of said horizontal portion, respectively, and the flat plate portion is formed contiguous to a distal edge of said upwardly inclined hook portion.

3. The fastening member according to claim 1, wherein the upwardly inclined hook portion and the downwardly inclined hook portion are formed contiguous to the first and second sections of the distal edge of said horizontal portion, respectively, and the flat plate portion is formed contiguous to a distal edge of said downwardly inclined hook portion.

4. A fastening member, comprising:

a substrate;

a horizontal portion substantially perpendicularly projected from the substrate;

a first inclined hook portion obliquely extending upward from and formed contiguous to a distal edge of the horizontal portion;

a flat plate portion, parallel with the substrate, extending downward from and formed contiguous to a distal edge of the first inclined hook portion; and a second inclined hook portion obliquely extending upward from and formed contiguous to a lower edge of the flat plate portion.

5. The fastening member according to claim 1, wherein said fastening member is entirely formed from a single metal plate, said horizontal portion, said upwardly inclined hook portion, said downwardly inclined hook portion and said flat plate portion are formed by cutting a portion of said metal plate and then, by bending the cut portion.

6. The fastening member according to claim 1, wherein said substrate is provided with an urging element for pressing a siding board to be fastened toward the flat plate portion.

7. The fastening member according to claim 1, wherein said substrate is provided with an upstanding portion at one of upper and lower edges thereof, said upstanding portion being projected backward from the back surface of the substrate, and at least one nailing hole is formed in the upstanding portion.

8. The fastening member according to claim 1, further including a laterally elongated recessed portion stamped out of the substrate from the back surface thereof, and at least one nailing hole formed in the bottom of said recessed portion.

9. The fastening member according to claim 1, wherein a section of a distal edge of said downwardly inclined hook portion is bent toward the substrate.

10. The fastening member according to claim 4, wherein said fastening member is entirely formed from a single metal plate, said horizontal portion, said first and second inclined hook portions, and said flat plate portion are formed by cutting a portion of said metal plate and then, by bending the cut portion.

11. The fastening member according to claim 4, wherein said substrate is provided with an urging element for pressing a siding board to be fastened toward the flat plate portion.

* * * * *